Dec. 8, 1942.  W. G. WEHR  2,304,720

OVERHEAD CARRIER SYSTEM

Filed March 28, 1941  2 Sheets-Sheet 1

INVENTOR.
WILLIAM G. WEHR
BY Kwis Hudson & Kent
ATTORNEYS

Dec. 8, 1942. W. G. WEHR 2,304,720
OVERHEAD CARRIER SYSTEM
Filed March 28, 1941 2 Sheets-Sheet 2
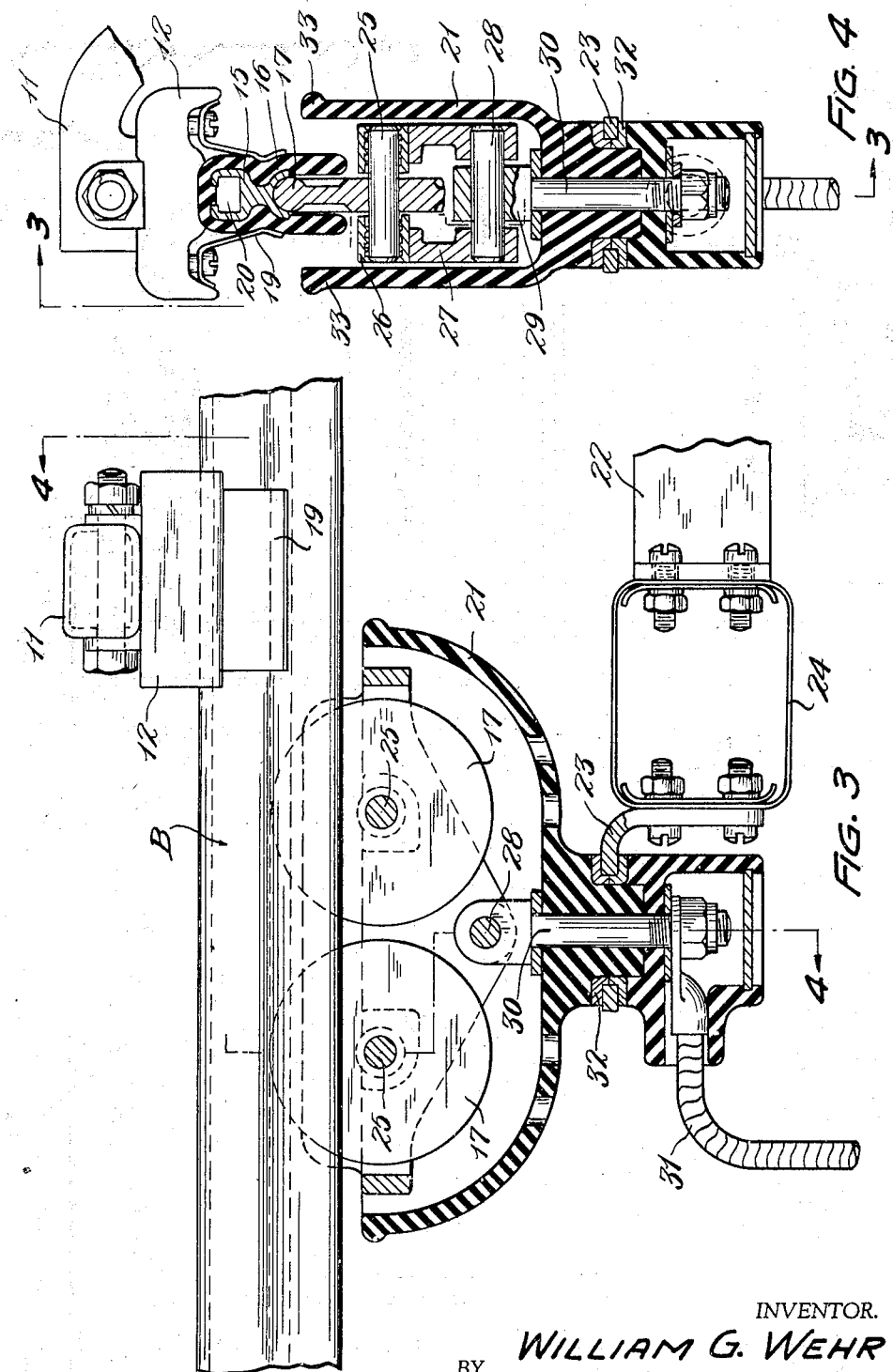
INVENTOR.
WILLIAM G. WEHR
BY Kwis Hudson & Kent
ATTORNEYS Patented Dec. 8, 1942

2,304,720

UNITED STATES PATENT OFFICE 2,304,720

OVERHEAD CARRIER SYSTEM

William G. Wehr, East Cleveland, Ohio, assignor to The Cleveland Crane & Engineering Company, Wickliffe, Ohio, a corporation of Ohio Application March 28, 1941, Serial No. 385,726

5 Claims. (Cl. 191—30)

The present invention relates to electrical distribution systems, and more particularly to an electrified overhead tramrail carrier system.

An object of the invention is the provision of a novel and improved electrical distribution system for electrified overhead tramrail carrier systems and the like, which distribution system will be simple and rugged in construction, easy to install, and reliable in operation, and which is so formed or constructed that it is impossible for workmen, etc., to accidentally come in contact with energized parts of conductors, etc.

Another object of the invention is the provision of a novel trolley or collector for an electrical distribution system adapted to cooperate with a trolley conductor comprising a conductor bar proper enclosed, except for a space along one side, in an insulating covering and so constructed and arranged that it will maintain proper contact with the trolley conductor at all times, even while negotiating sharp curves.

The invention resides in certain details of construction and combinations and arrangements of parts and further objects and advantages thereof will be apparent to those skilled in the art to which it relates from the following description of the preferred embodiment thereof described with reference to the accompanying drawings forming a part of this specification in which similar reference characters designate corresponding parts throughout the several views, and in which Fig. 1 is a side elevational view of a portion of an electrified overhead tramrail carrier system embodying the present invention.

Fig. 3 is a sectional view, with portions in elevation, on the line 3—3 of Fig. 4.

Fig. 4 is a sectional view, with portions in elevation, on the line 4—4 of Fig. 3.

Figure 1:
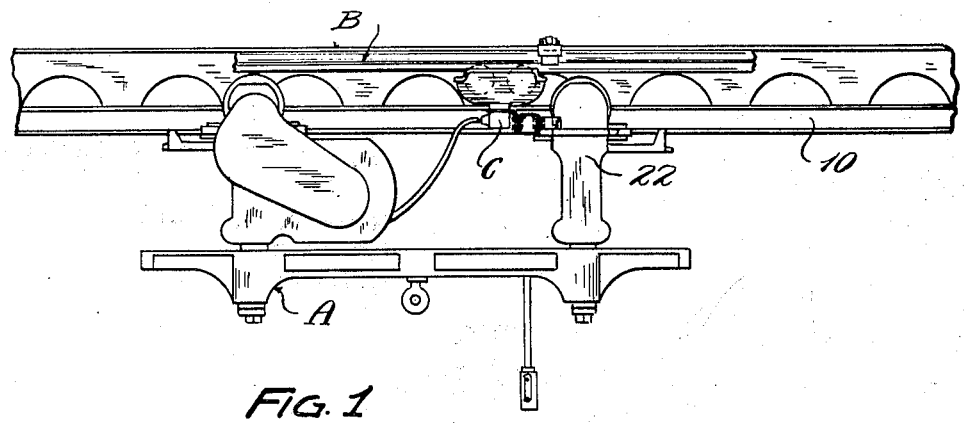
Figure 2:
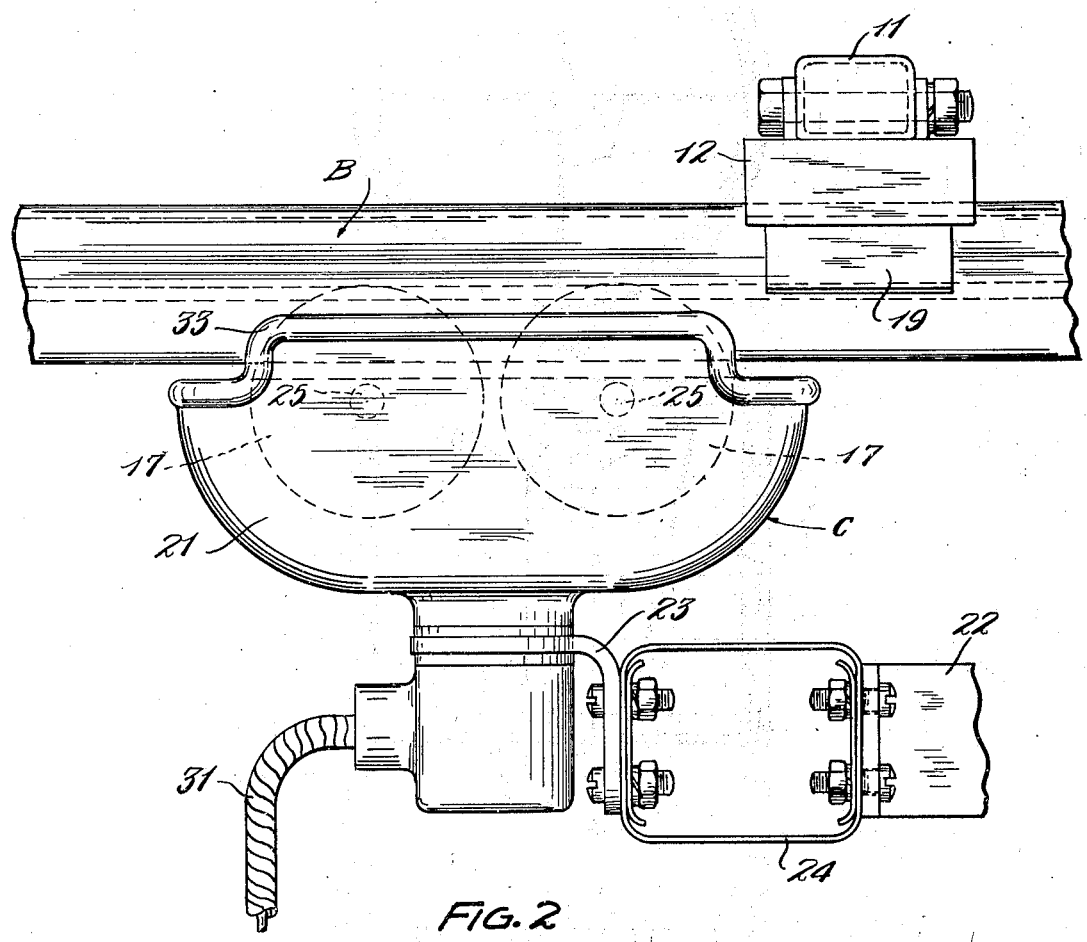
Fig. 2 is an enlarged view of a portion of Fig. 1.

Although the invention is susceptible of embodiment in various alternative constructions, it is herein shown and described as embodied in an electrified overhead tramrail carrier system of the monorail type. For the most part the tramrail system referred to herein is commercially known in the art as "Cleveland Tramrail" and only those parts which are necessary to a complete and full understanding of the invention are herein illustrated and described in detail.

Referring to the drawings, the reference character A designates generally a motor-driven, overhead carrier supported on and adapted to travel along an overhead track, including a monorail 10 supported from the ceiling of the building or the like in which the carrier system is housed. Since the carrier A is motor-driven, the track is electrified and comprises two or more trolley conductors B, only one of which is shown, located on opposite sides of the monorail 10. The trolley conductors B are supported by the rail 10 through the medium of brackets 11 connected to the rail in any convenient manner and to which the trolley conductors B are connected by insulating members 12, see Fig. 4.

The trolley conductor B is similar in construction to that shown in my copending application Serial No. 295,802 and will not be described in detail herein. Suffice it to say that the trolley conductor shown comprises one or more sections or lengths of conductor bar each of which comprises a metal bar-like member 15 of uniform cross-section throughout its length enclosed within an insulating material or sheath 16, preferably made of soft rubber cemented or otherwise securely fixed to the metal bar 15.

The bar 15, which is preferably made of aluminum, is generally rectangular in cross-sectional shape and is provided with longitudinal grooves or depressions on opposite sides thereof which, in addition to decreasing the weight of the bar, increase the radiating surface thereof and assist in securing the insulating covering thereto. The underside of the bar has a substantially semi-circular groove therein which provides a large concave contact surface for the collector wheels 17 of the collector assemblies C hereinafter specifically referred to. The insulating covering 16 is generally inverted U-shape in cross-section with the free ends thereof projecting a considerable distance below the bar 15, and has a plurality of inwardly projecting ridges adapted to cooperate with the longitudinal grooves in the sides of the bar 15 in securing the same to the metal bar. As shown, the insulating covering or sheath 16 is provided with a plurality of longitudinal grooves into which the lower ends of members 19 utilized in supporting the conductor bars engage.

The upper side of the bar 15 is provided with an undercut non-circular aperture 20 and when a plurality of sections or lengths of conductor bar are employed in making a trolley conductor, the abutting ends of adjacent conductor bars are preferably aligned and electrically and mechanically connected together by connectors including means adapted to extend into the longitudinal apertures 20 in the conductor bar and be retained therein by friction. Alternatively, a plurality of longitudinal apertures may be formed in each conductor bar, but when the conductor bars have a single longitudinal aperture therein, the apertures must be non-circular and the portions of the connector extending therein must conform at least to a portion of the non-circular apertures so as to prevent relative angular movement therebetween. The insulators 12 are the primary insulators for the bar 15 which is the trolley conductor proper and the sheath 16 constitutes a secondary insulator.

The carrier A comprises two or more collector assemblies designated C, each comprising a pair of aligned wheels 17 located within a two-part housing 21 formed of insulating material and rotatably connected to the frame 22 of the carrier A by a bracket 23 and a resilient member 24. The wheels 17 are fixed to pins 25 rotatably supported in bearings 26 secured in a rectangular frame member 27, which frame member is in turn pivotally connected to a pivot pin 28 fixed in the enlarged upper end 29 of a bolt-like member 30. The parts 17, 25, 26, 27, 28, 29, and 30 are made of metal and the connection to the electrical equipment on the carrier, including the traction motor, is made through a conductor 31 connected to the lower end of the bolt-like member 30 which is also utilized to hold the two parts of the housing 21 together. The housing 21 is provided with a bushing 32 of some suitable bearing material through the medium of which the housing is swivelled to the bracket 23.

The member 24 through the medium of which the collector assembly proper is connected to the frame of the carrier is rectangular in shape and is made of spring steel or the like, and allows a certain amount of relative movement between the housing 21 of the collector assembly and the carrier proper. The pivot for the frame 27 is located below the axis of the wheels 17 and midway between the same. The wheels are located very close together and the flexibility obtained by the pivot 28, the swivel connection between the housing 21 and the bracket 23, and the resilient or spring supporting member 24 permits the wheels to properly engage the trolley conductor at all times even while the carrier is negotiating comparatively sharp curves in the track.

It will be observed from the drawings that the upper edge of the housing 21 adjacent to the ends terminates shortly below the lower edges of the insulating sheath 16 of the trolley conductor B and that the sides 33 of the housing 21, that is, the parts thereof intermediate the end portion, extend a considerable distance above the lower edges of the insulating sheath 16. The fact that the sides of the housing 21 project above or overlie the lower portions of the insulating sheath 16 makes it practically impossible for an operator to accidentally come in contact with any parts of the device included in the electric circuit proper.

From the foregoing description of the preferred embodiment of the invention, it will be apparent that the objects of the invention heretofore enumerated and others have been accomplished and that I have provided an improved electrical distribution system for electrified overhead monorail carrier systems which, among other things, is simple in construction and dependable in operation, and is so formed that it is practically impossible for workmen and the like to accidentally come in contact with any of the electrical conductors proper. The current collector is light in construction and the wheels are close together and so mounted that they are always in proper contact with the trolley.

While the preferred embodiment of the invention has been described in considerable detail, it will be apparent that numerous changes may be made therein within the scope of this invention and it is my intention to hereby cover all adaptations, modifications, and changes therein which come within the practice of those skilled in the art to which the invention relates.

Having thus described my invention, I claim:

1. A current-collector for an electrical distribution system including a trolley conductor, said current-collector comprising a housing made of insulation, a member pivotally supported in said housing, wheels supported by said member for rotation upon axes parallel to the axis of rotation of said member and movable towards and from the trolley conductor, said wheels being located one in advance of the other and adapted to engage and travel along the trolley conductor, said housing substantially enclosing the portions of said member and wheels which are outside of and out of contact with said trolley conductor, and resilient means for supporting said housing.

2. A current-collector for an electrical distribution system including a trolley conductor, said current-collector comprising a housing made of insulation, a member pivotally supported in said housing, wheels rotatably supported in said member and located at opposite sides of the axis about which said member pivots, said wheels being positioned one in advance of the other and being adapted to engage and travel along the trolley conductor, said housing substantially enclosing the portions of said member and wheels which are outside of and out of contact with said trolley conductor, a bracket member, means for swivelly connecting said housing to said bracket member, and resilient means for supporting said bracket member.

3. A current-collector for an electrical distribution system including a trolley conductor, said current-collector comprising a housing made of insulation, a member pivotally supported in said housing, wheels rotatably supported in said member and located at opposite sides of the axis about which said member pivots, said wheels being positioned one in advance of the other and being adapted to engage and travel along the trolley conductor, the end of said housing being closed and the sides thereof projecting above the ends and adapted to overlap a portion of the trolley conductor whereby said housing substantially encloses the portions of said member and wheels which are outside of and out of contact with said trolley conductor, a bracket member, means for swivelly connecting said housing to said bracket member, and resilient means for supporting said bracket member.

4. In an electrical distribution system comprising a trolley conductor and a current-collector comprising a plurality of wheels adapted to engage and travel along said trolley conductor, said trolley conductor comprising a metallic member having a concave contact surface and a covering of insulation enclosing the same except for the concave contact surface, said insulating covering extending beyond said metallic member adjacent to said contact surface, said current-collector comprising a housing made of insulation, a member pivotally supported in said housing, a pair of wheels rotatably supported by said member for rotation about axes parallel to the axis of rotation of said member and movable towards and from said trolley conductor, said housing substantially enclosing the portions of said member and wheels which are outside of and out of contact with said trolley conductor, and resilient means for supporting said housing.

5. In an electrical distribution system comprising a trolley conductor and a current-collector comprising a plurality of wheels adapted to engage and travel along said trolley conductor, said trolley conductor comprising a metallic member having a concave contact surface and a covering of insulation enclosing the same except for the concave contact surface, said insulating covering extending beyond said metallic member adjacent to said contact surface, said current-collector comprising a housing made of insulation, a member pivotally supported in said housing, wheels rotatably supported in said member and located at opposite sides of the axis about which said member pivots, said housing substantially enclosing the portions of said member and wheels which are outside of and out of contact with said trolley conductor, a bracket member, means for swivelly connecting said housing to said bracket member, and resilient means for supporting said bracket member.

WILLIAM G. WEHR.